US011156792B2

United States Patent
Sahoo et al.

(10) Patent No.: US 11,156,792 B2
(45) Date of Patent: Oct. 26, 2021

(54) LOOSE TUBE CABLE WITH EMBEDDED STRENGTH MEMBER

(71) Applicant: Sterlite Technologies Limited, Gurgaon (IN)

(72) Inventors: Kishore Chandra Sahoo, Aurangabad (IN); Sravan Kumar, Aurangabad (IN); Pavan Kumar Moturu, Aurangabad (IN); Atul Mishra, Aurangabad (IN); Kavya Chintada, Aurangabad (IN)

(73) Assignee: STERLITE TECHNOLOGIES LIMITED, Gurgaon (IN)

( * ) Notice: Subject to any disclaimer, the term of this patent is extended or adjusted under 35 U.S.C. 154(b) by 0 days.

(21) Appl. No.: 16/774,281

(22) Filed: Jan. 28, 2020

(65) Prior Publication Data

US 2021/0096314 A1 Apr. 1, 2021

(30) Foreign Application Priority Data

Oct. 1, 2019 (IN) .............................. 201913039848

(51) Int. Cl.
*G02B 6/44* (2006.01)

(52) U.S. Cl.
CPC ........... *G02B 6/443* (2013.01); *G02B 6/4494* (2013.01)

(58) Field of Classification Search
CPC .... G02B 6/443; G02B 6/4494; G02B 6/4404; G02B 6/4433
USPC ................................................. 385/100, 113
See application file for complete search history.

(56) References Cited

U.S. PATENT DOCUMENTS

| | | | | |
|---|---|---|---|---|
| 6,253,012 B1* | 6/2001 | Keller | .................. | G02B 6/4436 385/103 |
| 6,751,383 B2* | 6/2004 | Um | ...... | G02B 6/4411 385/112 |
| 9,188,754 B1* | 11/2015 | Risch | ................... | G02B 6/4401 |
| 2001/0028773 A1* | 10/2001 | Kato | ................. | G02B 6/02219 385/109 |
| 2002/0122640 A1* | 9/2002 | Strong | ................. | G02B 6/4411 385/114 |
| 2003/0068147 A1* | 4/2003 | Nechitailo | ........... | G02B 6/4429 385/114 |
| 2010/0202741 A1* | 8/2010 | Ryan | ...................... | G02B 6/447 385/113 |
| 2010/0215328 A1* | 8/2010 | Tatat | .................... | G02B 6/4495 385/113 |
| 2013/0084047 A1* | 4/2013 | Baucom | ............... | G02B 6/4404 385/114 |

* cited by examiner

*Primary Examiner* — John Bedtelyon

(57) ABSTRACT

The present disclosure provides an optical fiber cable (100). The optical fiber cable (100) includes a plurality of optical fibers ribbons (102) lying substantially along a longitudinal axis (116) of the optical fiber cable (100). Further, the optical fiber cable (100) includes a first layer (104) surrounding the plurality of optical fibers ribbons (102). Furthermore, the optical fiber cable (100) includes a second layer (106) surrounding the first layer (104). Furthermore, the optical fiber cable (100) includes a third layer (108) surrounding the second layer (106). Moreover, the optical fiber cable (100) includes a fourth layer (140) surrounding the third layer (108). The first layer (104) is a water blocking tape. The third layer (108) is sandwich of water blocking material and ECCS steel tape. Moreover, the optical fiber cable (100) includes two pairs of strength members (112*a*-*b*; 112*c*-*d*) embedded inside the second layer (106).

15 Claims, 1 Drawing Sheet

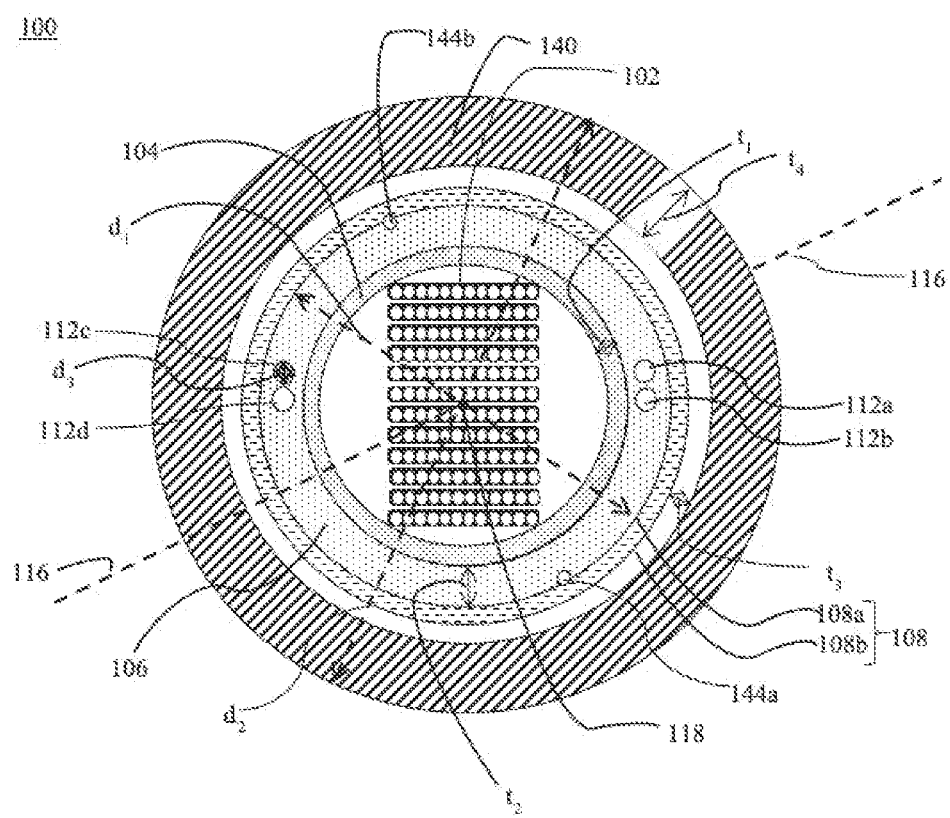

LOOSE TUBE CABLE WITH EMBEDDED STRENGTH MEMBER

TECHNICAL FIELD

The present disclosure relates to the field of optical fiber cables. More particularly, the present disclosure relates to the optical fiber cables for indoor, outdoor and underground applications. The present application is a patent of addition based on, and claims priority from an Indian application Nos. 201913039848 filed on 1 Oct. 2019 and 201811002718 filed on 23 Jan. 2018, the disclosure of which is hereby incorporated by reference herein.

BACKGROUND

Optical fiber cables have secured an important position in building network of modern communication systems across the world. One such type of optical fiber cables are optical fiber ribbon cables. These optical fiber ribbon cables are installed in ducts. These optical fiber ribbon cables include a plurality of optical fiber ribbons. Each optical fiber ribbon includes a number of optical fibers placed adjacent and bonded together with a matrix material. These optical fiber ribbons may be held inside a central loose tube which may be covered by additional layers such as water blocking layers, armouring layer, sheathing layer and the like. Typically, these optical fiber ribbon cables include strength members embedded in a jacket of the cable. In addition, these optical fiber ribbon cables can be prepped and spliced rapidly through mass fusion splicing. This leads to easy installation, less installation time, low installation cost and the like. Traditionally, these optical fiber ribbon cables do not have any gel present inside the core which reduces preparation time.

In prior art U.S. Pat. No. 6,546,176 B2, an optical fiber cable is provided. The optical fiber cable includes a buffer tube surrounding a number of optical fibers. The buffer tube is surrounded by a water swellable yarn or a tape or a combination thereof. In addition, the optical fiber cable includes one or more layers of armor around the water swellable layers. Moreover, the optical fiber cable includes an outer jacket surrounding the armor layers. Further, the buffer tube is reinforced by two longitudinally extending strength members. Each strength member is partially embedded inside the buffer tube. The buffer tube is preferably made of high density polyethylene ("HDPE"), polybutylene terephthalate, polypropylene, polyvinylchloride ("PVC") or poly-methylpentene. The currently available optical fiber ribbon cables have several drawbacks. These optical fiber ribbon cables lack in flexibility and have high bend radius due to the presence of embedded strength members in the jacket. These strength members induce preferential bending in the cable. In preferential bending, the optical fiber cable having diagonally opposite strength members bend readily in the plane that passes through the strength members but do not bend readily in an orthogonal plane. Such preferential bending is undesirable for cable blowing operations.

In light of the above stated discussion, there is a need for an optical fiber cable which can overcome the disadvantages.

OBJECT OF THE DISCLOSURE

A primary object of the present disclosure is to provide an optical fiber cable with improved blowing performance.

Another object of the present disclosure is to provide the optical fiber cable with a dry ribbon buffer tube to improve optical performance.

Another object of the present disclosure is to provide the optical fiber cable with a dry ribbon buffer tube to improve water resistant penetration.

Another object of the present disclosure is to provide an optical fiber cable with improved bend radius.

Yet another object of the present disclosure is to provide more tensile strength to an optical fiber cable.

Yet another object of the present disclosure is to provide an optical fiber cable suitable for mid-span operation and reduces time taken for the mid-span operation.

Yet another object of the present disclosure is to eliminate preferential bending of the optical fiber cable.

SUMMARY

In an aspect, the present disclosure provides an optical fiber cable. The optical fiber cable includes a plurality of optical fibers ribbons lying substantially along a longitudinal axis of the optical fiber cable. Further, the optical fiber cable includes a first layer surrounding the plurality of optical fibers ribbons. Furthermore, the optical fiber cable includes a second layer surrounding the first layer. In addition, the optical fiber cable includes a third layer surrounding the second layer. Moreover, the optical fiber cable includes a fourth layer surrounding the third layer. Also, the optical fiber cable includes two pairs of strength members embedded inside the second layer and positioned 180 degree apart from each other. The first layer is a water blocking tape. In addition, the first layer has a thickness in a range of about 0.2 millimeter to 0.3 millimeter. The second layer is a dry buffer tube layer made of low smoke zero halogen (LSZH) material. Further, the second layer has a diameter in a range of about 11 millimeters to 12 millimeters. Further, the second layer has a thickness in a range of about 2.5 millimeters to 3.0 millimeters. Furthermore, the second layer maintains circular cross section. Moreover, the second layer reduces the ovality of the optical fiber cable to at least 5 percent. The third layer is made of a first sub layer and a second sub layer. The first sub layer surrounds the second layer and the second sub layer surrounds the first sub layer. The first sub layer is made of a water blocking material and the second sub layer is made of electrolytic chrome coated steel tape. The second sub layer has a thickness in a range of about 0.15+0.025 millimeters. The third layer is a sandwich of water swellable material and ECCS steel tape. The fourth layer is made of polyethylene material. Further, the fourth layer has a diameter in a range of about 14 millimeters to 16 millimeters. Furthermore, the fourth layer has a thickness in a range of about 1.5 millimeter to 1.7 millimeter.

In an embodiment of the present disclosure, the optical fiber cable includes a ripcord positioned between the third layer and the fourth layer and extending along the longitudinal axis of the optical fiber cable. Further, the ripcord is made of polyester based twisted yarns. Moreover, the plurality of ripcords facilitates easy stripping of the optical fiber cable.

In an embodiment of the present disclosure, the first layer and the first sub layer of the third layer prevents ingression of water inside the core of the optical fiber cable.

In an embodiment of the present disclosure, the two pairs of strength members are made of at least one of fiber reinforced plastic and steel wire.

In an embodiment of the present disclosure, each strength member of the two pairs of strength members is characterized by a third diameter. The third diameter of each strength member of the two pairs of strength members is in a range of about 1.4 millimeters to 1.6 millimeters.

In an embodiment of the present disclosure, each of the two pairs of strength members includes a first strength member and a second strength member. In addition, a distance between the first strength member and the second strength member is in a range of about 0.1 millimeter to 0.4 millimeter.

In an embodiment of the present disclosure, the dry loose tube layer has a fill factor in a range of about 0.35-0.40.

In an embodiment of the present disclosure, the optical fiber cable with 144 optical fibers and no armoring has an inner fill factor in a range of about 0.055-0.065.

In an embodiment of the present disclosure, the optical fiber cable with 144 optical fibers and no armoring has an overall fill factor in a range of about 0.034-0.041.

In an embodiment of the present disclosure, the first sub layer and the second sub layer are bonded. The first sub layer and the second sub layer are bonded with at least one of glue, epoxy resins and polyester resins.

In an embodiment of the present disclosure, the optical fiber cable includes 144 optical fibers.

In an embodiment of the present disclosure, the dry loose tube layer is at a diagonal distance of about 4.95 millimeters from the plurality of optical fiber ribbons.

In an embodiment of the present disclosure, the dry loose tube layer has a free space in a range of about 1.26 millimeters-1.66 millimeters.

STATEMENT OF THE DISCLOSURE

The present disclosure relates to an optical fiber cable. The optical fiber cable includes a plurality of optical fibers ribbons lying substantially along a longitudinal axis of the optical fiber cable. Further, the optical fiber cable includes a first layer surrounding the plurality of optical fibers ribbons. Furthermore, the optical fiber cable includes a second layer surrounding the first layer. In addition, the optical fiber cable includes a third layer surrounding the second layer. Moreover, the optical fiber cable includes a fourth layer surrounding the third layer. Also, the optical fiber cable includes two pairs of strength members embedded inside the second layer and positioned 180 degree apart from each other. The first layer is a water blocking tape. In addition, the first layer has a thickness in a range of about 0.2 millimeter to 0.3 millimeter. The second layer is a dry buffer tube layer made of low smoke zero halogen (LSZH) material. Further, the second layer has a diameter in a range of about 11 millimeters to 12 millimeters. Further, the second layer has a thickness in a range of about 2.5 millimeters to 3.0 millimeters. Furthermore, the second layer maintains circular cross section. Moreover, the second layer reduces the ovality of the optical fiber cable to at least 5 percent. The third layer is made of a first sub layer and a second sub layer. The first sub layer surrounds the second layer and the second sub layer surrounds the first sub layer. The first sub layer is made of a water blocking material and the second sub layer is made of electrolytic chrome coated steel tape. The second sub layer has a thickness in a range of about 0.15+0.025 millimeters. The third layer is a sandwich of water swellable material and ECCS steel tape. The fourth layer is made of polyethylene material. Further, the fourth layer has a diameter in a range of about 14 millimeters to 16 millimeters. Furthermore, the fourth layer has a thickness in a range of about 1.5 millimeter to 1.7 millimeter.

BRIEF DESCRIPTION OF DRAWINGS

Having thus described the disclosure in general terms, reference will now be made to the accompanying FIGURES, wherein:

FIG. 1 illustrates a cross sectional view of an optical fiber cable, in accordance with an embodiment of the present disclosure.

It should be noted that the accompanying FIGURES are intended to present illustrations of exemplary embodiments of the present disclosure. These FIGURES are not intended to limit the scope of the present disclosure. It should also be noted that accompanying FIGURES are not necessarily drawn to scale.

DETAILED DESCRIPTION OF EMBODIMENTS

Reference will now be made in detail to selected embodiments of the present disclosure in conjunction with accompanying FIGURES. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying FIGURES are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of optical fiber cable 100 for indoor and outdoor applications, in accordance with an embodiment of the present disclosure. Further, the optical fiber cable 100 is used for aerial installations, underground installations, indoor installations and the like. Also, the optical fiber cable 100 is used for broadband applications, communication applications and the like. The cross sectional view describes a layered structure and distribution of discrete elements of the optical fiber cable 100. The layered structure of the optical fiber cable 100 includes a plurality of optical fibers ribbons 102, a first layer 104, a second layer 106, a third layer 108 and a fourth layer 140. In addition, the optical fiber cable 100 includes two pairs of strength members 112a-112d and one or more ripcords. The above combination of structural elements enables an improvement in a plurality of parameters of the optical fiber cable 100. The plurality of parameters includes a tensile strength, bend radius, flexibility, a crush resistance, installation efficiency, and the like.

The optical fiber cable 100 includes the plurality of optical fibers ribbons 102. The plurality of optical fibers ribbons 102 lie substantially along a longitudinal axis 116 of the optical fiber cable 100. The longitudinal axis 116 passes through a geometrical center 118 of the optical fiber cable 100. The longitudinal axis 116 is an imaginary axis passing through the geometrical center 118 of the optical fiber cable 100. In general, multiple optical fibers are sandwiched, encapsulated, and/or edge bonded to form an optical-fiber ribbon. Optical fiber ribbon may be defined as an encapsulated optical fiber. In general, each of the plurality of optical fibers, in the plurality of optical fibers ribbons 102 is a fiber used for transmitting information as light pulses from one end of the optical fiber cable 100 to another end of the optical fiber cable 100. In addition, each of the plurality of optical fibers is a thin strand of glass capable of transmitting optical signals. Also, each of the plurality of optical fibers is configured to transmit large amounts of information over long distances with relatively low attenuation. Further, each of the plurality of optical fibers includes a core region and a cladding region. The core region is an inner part of an optical fiber and the cladding section is an outer part of the optical fiber. Moreover, the core region is defined by a central longitudinal axis 116 of each of the plurality of optical fibers. In addition, the cladding region surrounds the core region.

In an embodiment of the present disclosure, the number of optical fibers in one ribbon is constant in all plurality of ribbons. In another embodiment of the present disclosure, the number of optical fibers in one ribbon may vary. Further, the plurality of optical-fiber ribbons 102 is aggregated to form a ribbon stack. The ribbon stack has various sizes and shapes as per number of fibers in a ribbon. In an embodiment of the present disclosure, optical fiber ribbons 102 are arranged to form a rectangular ribbon stack. In another embodiment of the present disclosure, the plurality of optical fiber ribbons 102 may arrange to form any different shape.

In an embodiment of the present disclosure, the plurality of optical fibers in the plurality of optical fibers ribbons 102 has a fiber attenuation of about 0.4 dB/km at a wavelength of about 1310 nanometers. In another embodiment of the present disclosure, the plurality of optical fibers in the plurality of optical fibers ribbons 102 has a fiber attenuation of about 0.40 dB/km at a wavelength of 1083 nanometers. In yet another embodiment of the present disclosure, the plurality of optical fibers in the plurality of optical fibers ribbons 102 has a fiber attenuation of about 0.30 dB/km at a wavelength of 1550 nanometers. In yet another embodiment of the present disclosure, the plurality of optical fibers in the plurality of optical fibers ribbons 102 may have different fiber attenuation at respective wavelength. The fiber attenuation corresponds to a loss in optical power as the light travels through the optical fiber. In an embodiment of the present disclosure, the plurality of optical fibers in the plurality of optical fibers ribbons 102 is single mode optical fibers. In another embodiment of the present disclosure, the plurality of optical fibers in the plurality of optical fibers ribbons is multi-mode optical fibers. In an embodiment of the present disclosure, the optical fiber cable 100 includes 144 optical fibers.

The optical fiber cable 100 includes the first layer 104. The first layer 104 surrounds the plurality of optical fibers ribbons 102. The first layer 104 is a water blocking tape. The water blocking tape is used to prevent ingression of water and moisture inside the core of the optical fiber cable 100. The core is a region enclosed by the first layer 104 of the optical fiber cable 100. The first layer 104 is characterized by a first thickness $t_1$. Further, the first thickness $t_1$ of the first layer is in a range of about 0.2 millimeter to 0.3 millimeter. In an embodiment of the present disclosure, the thickness of the first layer 104 has any suitable thickness.

The optical fiber cable 100 includes the second layer 106. The second layer 106 concentrically surrounds the first layer 104. The second layer 106 is a dry buffer tube layer. The dry buffer tube layer does not contain any gel, grease and the like. The buffer tube lying substantially along the longitudinal axis 116 of the optical fiber cable 100. In addition, the second layer 106 provides mechanical isolation, physical damage protection and identification of each of the plurality of optical fibers ribbons 102. Further, the buffer tube layer prevents ingression of water inside the optical fiber ribbons. The second layer 106 is made of low smoke zero halogen (LSZH) material. The low smoke zero halogen (LSZH) reduces an amount of toxic and corrosive gas emitted during combustion. The second layer 106 is characterized by a first diameter $d_1$. Further, the first diameter $d_1$ of the second layer 106 is in a range of about 11 millimeters to 12 millimeters. In an embodiment of the present disclosure, the first diameter $d_1$ of the second layer is in any suitable range. The second layer 106 is characterized by a second thickness $t_2$. Further the second thickness $t_2$ of the second layer 106 is in a range of about 2.5 millimeters to 3.0 millimeters. In an embodiment of the present disclosure, the second layer 106 is characterized by the second thickness $t_2$ in any suitable range. The low smoke zero halogen (LSZH) material is used to produce dry buffer tube to maintain circular cross-section of the optical fiber cable 100. Moreover, the low smoke zero halogen (LSZH) material is used to reduce the ovality of the optical fiber cable 100 to at least 5 percent. Generally, ovality is defined as the degree of deviation from the perfect circularity of the cross section of the optical fiber cable. In an embodiment of the present disclosure, Low smoke zero halogen has a very low melt flow index and very high melt strength. These properties help manufacturing the buffer tube without using vacuum calibrator. It results in reduction of ovality of tube which in turn reduces the ovality of the overall cable. In addition, the low smoke zero halogen (LSZH) material is used to ease the installation in mid-spanning. In an embodiment of the present disclosure, the second layer 106 is made of any other suitable material. In an embodiment of the present disclosure, the dry loose tube layer has a fill factor in a range of about 0.35-0.40. The fill factor is defined as a ratio of area of ribbon stack to inner area of the dry loose tube. The optical fiber cable 100 is optimized to achieve the fill factor in a range of about 0.35-0.40 for the dry loose tube layer. Generally, if the fill factor is more than 0.4, it imposes attenuation problems. If the fill factor is less than 0.35, it makes the cable bulky and increases the chances of water penetration inside the cable. In an embodiment of the present disclosure, the dry loose tube layer is at a diagonal distance of about 4.95 millimeters from the plurality of optical fiber ribbons 102. When the ribbons are placed in stacks inside the buffer tube, the diagonal distance is defined as the theoretical distance between the inner wall of the buffer tube and one of the edges of the ribbon stack.

The optical fiber cable 100 includes the third layer 108. The third layer 108 is made of a first sub layer 108a and a second sub layer 108b. The first sub layer 108a surrounds the second layer 106 and the second sub layer 108b surrounds the first sub layer 108a. The first sub layer 108a is made of a water blocking material and the second sub layer 108b is made of electrolytic chrome coated steel tape. The first sub layer 108a may have any suitable thickness. The second sub layer 108b has a third thickness $t_3$ in a range of about 0.15±0.025 millimeters. The third layer 108 is a sandwich of two layers made of water blocking material and ECCS tape. The ECCS tape is a metallic armor. In an embodiment of the present disclosure, the first sub layer 108a and the second sub layer 108b are bonded. The first sub layer 108a and the second sub layer 108b are bonded with at least one of glue, epoxy resins and polyester resins. In an embodiment of the present disclosure, the first sub layer 108a and the second sub layer 108b may be bonded with any other suitable bonding material. In an embodiment of the present disclosure, the bonding of the first sub layer 108a with the second sub layer 108b helps in maintaining good integrity with different layers of the optical fiber cable 100 during the bending of the optical fiber cable 100 or pulling of the optical fiber cable 100 during installation. In an embodiment of the present disclosure, the ECCS tape has a coating over its surface area. In an embodiment of the present disclosure, the coating is made of a copolymer. In an embodiment of the present disclosure, the coating helps in bonding of the ECCS tape with the Water Blocking Tape. In another embodiment of the present disclosure, the coating on the ECCS tape helps the tape in bonding with outer jacket. In yet another embodiment of the present disclosure, the coating on the ECCS tape helps in bonding of the ECCS tape with any other layer of the optical fiber cable 100. In an embodiment of the present disclosure, the copolymer coating is made using ethylene acrylic acid (EAA). In an embodiment of the present disclosure, the first sub layer 108a and the second sub layer 108b is in physical contact with each other.

In an embodiment of the present disclosure, the optical fiber cable 100 does not include any metallic armor. In an embodiment of the present disclosure, the metallic armor is made of a corrugated electrolytic chrome-coated steel (ECCS) tape. The corrugated ECCS tape is used to limit the signal attenuation during fire. In another embodiment of the present disclosure, the metallic armor might be separated from water swellable layer. In another embodiment of the present disclosure, the armor is made of flat fiber reinforced plastic (FRP). In yet another embodiment of the present disclosure, the metallic armor is made of steel wire. In yet another embodiment of the present disclosure, the metallic armor is made of steel tape. In yet another embodiment of the present disclosure, the armor is made of glass roving yarns. In yet another embodiment of the present disclosure, the armor is made of aramid yarns. In yet another embodiment of the present disclosure, the armor is made of any other suitable material.

The optical fiber cable 100 includes the fourth layer 140. The fourth layer 140 concentrically surrounds the third layer 108. The fourth layer 140 is a sheath made of polypropylene. In an embodiment of the present disclosure, the fourth layer 140 is made of any other suitable material. In an example, the other suitable material includes polyamide 12, low smoke zero halogen, High density polyethylene material (hereinafter "HDPE") and Medium density polyethylene material (hereinafter "MDPE"). The fourth layer 140 protects the optical fiber cable 100 from harsh environment and harmful UV rays. In addition, the fourth layer 140 has the inherent ability to resist crushes, kinks and tensile stress. The fourth layer 140 is characterized by a second diameter $d_2$. The second diameter $d_2$ is an outer diameter of the fourth layer 140. The second diameter $d_2$ of the fourth layer 140 is in a range of about 14 millimeters to 16 millimeters. The fourth layer 140 is characterized by a fourth thickness $t_4$. Further the fourth thickness $t_4$ of the fourth layer 140 is in a range of about 1.5 millimeters to 1.7 millimeters. In an embodiment of the present disclosure, the fourth layer 140 characterized by the second diameter $d_2$ is in any suitable range. In an embodiment of the present disclosure, the fourth layer 140 characterized by the fourth thickness $t_4$ is in any suitable range.

The optical fiber cable 100 includes the two pairs of strength member's 112a-d. The two pairs of strength member's 112a-d are embedded longitudinally inside the second layer 106. Further, each of the two pairs of strength member's 112a-d is uniformly distributed inside the second layer 106. Further, the two pairs of strength member's 112a-d are spaced 180 degree apart. In an embodiment of the present disclosure, the two pairs of strength member's 112a-d are circular in cross section. In general, the two pairs of strength member's 112a-d are embedded in the second layer 106 to improve bend radius and flexibility of the optical fiber cable 100. In addition, the two pairs of strength member's 112a-d are embedded in the second layer 106 to restrict shrinkage of layers of optical fiber cable 100 during thermal cycling. Moreover, the two pairs of strength member's 112a-d provide robustness and tensile strength to the optical fiber cable 100. The two pairs of strength member's 112a-d are made of at least one of fiber reinforced plastic (FRP) and steel wire. In an embodiment of the present disclosure, the pairs of strength members 112a-d are made of any other suitable material. In an embodiment of the present disclosure, the number of strength members in the optical fiber cable 100 is 4. In another embodiment of the present disclosure, the number of strength members may vary.

In an embodiment of the present disclosure, the two pairs of strength members 112a-b; 112c-d are spaced 180 degree apart. The two pairs of strength member's 112a-d include a first pair of strength members and a second pair of strength members. The first pair of strength members includes a first strength member 112a and a second strength member 112b. The second pair of strength members includes a first strength member 112c and a second strength member 112d. The first strength member 112a and the second strength member 112b are separated by a distance. The distance between the first strength members 112a and the second strength member 112b is in the range of 0.1 millimeter to 0.4 millimeter. The closeness of the strength members induces better flexibility to the optical fiber cable 100. The optical fiber cable 100 is optimized for flexibility and bending by keeping the distance between the first strength member and second strength member of both the pairs of strength members in the range of 0.1 mm to 0.4 mm. In an embodiment of the present disclosure, the distance between the first strength members 112a and the second strength member 112b may have any suitable range. In addition, each strength member of the two pairs of strength members 112 is characterized by a third diameter $d_3$. Further, the third diameter $d_3$ of each strength member of the two pairs of strength member is in a range of about 1.4 millimeters to 1.8 millimeters. In an embodiment of the present disclosure, the third diameter $d_3$ of each strength member of the two pairs of strength members is in any suitable range.

The optical fiber cable 100 includes a plurality of ripcords 144a-144b. The plurality of ripcords 144a-144b lies substantially along the longitudinal axis 116 of the optical fiber cable 100. The plurality of ripcords 144a-144b facilitates easy access to the plurality of optical fibers. In an embodiment of the present disclosure, the number of ripcords present in the optical fiber cable 100 is 2. In another embodiment of the present disclosure, the number of ripcords in the optical fiber cable 100 may vary. In an embodiment of the present disclosure, the position of the plurality of ripcords 144a-144b is between the second layer 106 and the first sub layer 108a of the third layer 108. In another embodiment of the present disclosure, the plurality of ripcords 144a-144b is embedded in any one of the layers. In an embodiment of the present disclosure, the plurality of ripcords 144a-144b is made of polyester based twisted yarns. In another embodiment of the present disclosure, the plurality of ripcords 144a-144b is made of any other suitable material.

In an embodiment of the present disclosure, the optical fiber cable 100 with 144 optical fibers and no armoring has an inner fill factor in a range of about 0.055-0.065. The inner fill factor of the optical fiber cable 100 is defined as a ratio of sum of area of optical fibers to cross-sectional area of bore formed by sheath (the fourth layer 140). In an embodiment of the present disclosure, the optical fiber cable with 144 optical fibers and no armoring has an overall fill factor in a range of about 0.034-0.041. The overall fill factor of the optical fiber cable 100 is defined as a ratio of sum of area of optical fibers to cross-sectional area of the optical fiber cable 100. In an embodiment of the present disclosure, the dry loose tube layer has a free space in a range of about 1.26 millimeters-1.66 millimeters. The free space of the dry loose tube layer is equal to buffer tube inner diameter minus diagonal distance of ribbon stack. The free space in a range of about 1.26 millimeters-1.66 millimeters is for optimizing optical performance and water blocking performance of the optical fiber cable 100.

The optical fiber cable 100 is used for installation in ducts and micro ducts. The optical fiber cable 100 is used for indoor and outdoor applications. The optical fiber cable 100 is used without any grounding requirements. The optical fiber cable 100 is a ribbon type optical fiber cable. In general, ribbon cables have inherent advantage of mass fusion splicing. The mass fusion splicing makes the installation easy and saves a lot of time. Ribbon cables offer high packing density and higher fiber counts which enables more efficient use of limited duct space. The optical fiber cable 100 improves the blowing performance of the cable.

In an embodiment of the present disclosure, the optical fiber cable 100 includes a plurality of colored optical fibers. The color of each of the plurality of optical fibers is selected from a group. The group includes blue, orange, green, brown, slate, white, red, black, yellow, violet, pink and aqua. The plurality of optical fibers is present inside a white color buffer tube. The plurality of optical fibers might also be present inside any other colored buffer tube.

The optical fiber cable of the present disclosure offers a number of advantages over the conventional cables. Further, the optical fiber cable is a ribbon cable which has an inherent advantage of mass fusion splicing to make the installation easy and saves a lot of time. Moreover, the ribbon cables having dry buffer and dry core reduces preparation time due to absence of gel. Furthermore, the optical fiber cable with the first layer and one of the sub layers of the third layer of water blocking tape meets the water penetration test. The low smoke zero halogen material used for the loose tube is softer than polypropylene, polybutylene terephthalate and high density polyethylene. This increases ease of installation and thus improves overall installation efficiency. The low smoke zero halogen material doesn't need any additional equipment for achieving low ovality of a dry buffer tube. This improves the process efficiency. The combination of buffer tube made of low smoke zero halogen and outer jacket made of polyethylene provides environmental protection. The sandwich layers of water blocking tape and ECCS tape reduces one process of material input in manufacturing and helps in both water penetration and armoring of cable.

The foregoing descriptions of specified embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

We claim:

1. An optical fiber cable (100) comprising:
    a plurality of optical fiber ribbons (102), each comprising a plurality of optical fibers; and
    at least one layer encapsulating the plurality of optical fiber ribbons (102);
    wherein the at least one layer comprises a dry loose tube layer (106), wherein the dry loose tube layer has at least one embedded strength member (112a, 112b, 112c, 112d).

2. The optical fiber cable (100) as claimed in claim 1 wherein the plurality of optical fiber ribbons (102) are positioned substantially along a longitudinal axis.

3. The optical fiber cable (100) as claimed in claim 1 wherein, the at least one embedded strength member (112a, 112b, 112c, 112d) placed inside the dry loose tube layer (106) comprises two pairs of embedded strength members.

4. The optical fiber cable (100) as claimed in claim 1 wherein, the at least one embedded strength member (112a, 112b, 112c, 112d) placed inside the dry loose tube layer (106) comprises two pairs of embedded strength members (112a-112b and 112c-112d) that are symmetrically placed 180 degree apart inside the dry loose tube layer (106).

5. The optical fiber cable (100) as claimed in claim 1 wherein the at least one layer further comprises at least one of: a water blocking tape layer (104), a water blocking material sub-layer (108a), an electrolytic chrome coated steel tape sub-layer (108b) and a polypropylene layer.

6. The optical fiber cable (100) as claimed in claim 1 wherein, the at least one embedded strength member (112a, 112b, 112c, 112d) placed inside the dry loose tube layer (106) comprises two pairs of embedded strength members (112a-112b and 112c-112d), wherein the two pairs of strength members (112a-112b and 112c-112d) are made of at least one of fiber reinforced plastic, steel wire, glass roving yarns and aramid yarns.

7. The optical fiber cable (100) as claimed in claim 1 wherein, the at least one embedded strength members (112a, 112b, 112c, 112d) placed inside the dry loose tube layer (106) comprises two pairs of embedded strength members (112a-112b and 112c-112d), wherein each strength member of the two pairs of strength members (112a-112b and 112c-112d) has a diameter in a range of 1.4 millimeters to 1.6 millimeters.

8. The optical fiber cable (100) as claimed in claim 1 wherein, the at least one embedded strength member (112a, 112b, 112c, 112d) placed inside the dry loose tube layer (106) comprises two pairs of embedded strength members (112a-112b and 112c-112d), wherein each pair of strength members (112a-112b and 112c-112d) comprises a first strength member (112a, 112c) and a second strength member (112b, 112d), wherein a distance between the first strength member (112a, 112c) and the second strength member (112b, 112d) is in a range of about 0.1 millimeter to 0.4 millimeter.

9. The optical fiber cable (100) as claimed in claim 1 wherein the dry loose tube layer (106) is made of a low smoke zero halogen (LSZH) material.

10. The optical fiber cable (100) as claimed in claim 1, wherein the dry loose tuber layer (106) has at least one of:
 a diameter in a range of 11 millimeters to 12 millimeters;
 a thickness is in a range of 2.5 millimeters to 3.0 millimeters,
 a free space in a range of 1.26 millimeters 1.66 millimeters.

11. The optical fiber cable (100) as claimed in claim 1, wherein the dry loose tube layer (106) reduces ovality of the optical fiber cable (100) to at least 5 percent.

12. The optical fiber cable (100) as claimed in claim 1, wherein the dry loose tube layer (106) has a fill factor in a range of about 0.35-0.40.

13. The optical fiber cable (100) as claimed in claim 1, wherein the dry loose tube layer (106) is at a diagonal distance of about 4.95 millimeters from the plurality of optical fiber ribbons (102).

14. The optical fiber cable (100) as claimed in claim 1, wherein the optical fiber cable (100) has at least one of: an inner fill factor in a range of 0.055-0.065 and an overall fill factor in a range of 0.034-0.041, when the optical fiber cable (100) has no armoring.

15. The optical fiber cable (100) as claimed in claim 1 further comprises a water blocking material sub-layer (108a) and an electrolytic chrome coated steel tape sub-layer (108b), which are bonded with at least one of glue, epoxy resins and polyester resins.

* * * * *